United States Patent Office 3,060,094

Patented Oct. 23, 1962

1

3,060,094
PREPARATION OF VIRUS VACCINES
Ray M. Dutcher, Belchertown, Ralston B. Read, Jr., Sunderland, and Warren Litsky, Amherst, Mass. (all % University of Massachusetts, Amherst, Mass.)
No Drawing. Filed Apr. 7, 1959, Ser. No. 804,569
4 Claims. (Cl. 167—78)

This invention relates to a process for the preparation of virus vaccines and to the improved virus vaccines so produced. The invention broadly involves the inactivation of living virus microorganisms at high temperatures for very short periods of time.

A virus vaccine is usually defined as a suspension of inactivated or attenuated microorganisms. A suspension of living virus microorganisms has the ability to produce an immunity in man or animal but its use is accompanied by the danger of producing the disease. The use of attenuated or partially inactivated virus vaccines is also not without danger because of the possibility that the microorganisms contained therein may also produce diseases. The killed or inactivated type of virus vaccine is generally harmless when properly administered, and its value depends on its ability to develop immunity.

The present invention provides a process for the preparation of inactivated virus vaccines which can be used to provide suitable immunity against virus diseases. The invention also includes a process for the preparation of partially inactivated virus vaccines which can be used to obtain lowered virulence with a subsequent reduction in deleterious response of the animal to the vaccine. The process of this invention can also be used to prepare inactivated viral antigens for use in serological diagnostic testing as well as for preparing inactivated viral antigens to be used in the subsequent preparation of specific antiserum in man and animals to be used either in serological diagnostic procedures or in therapeutic passive immunization procedures in both man and animals.

The invention broadly comprises the heating of live virus suspensions at high temperatures for very short periods of time. The high temperature-short time heating provides an advantageous method of inactivating live virus suspensions thus inactivating specific pathogenic agents with a minimum of destructive effect upon its antigenic structure.

Different types of equipment can be used to perform the rapid heat treatment of the virus suspensions such as the heat exchanger described in the article entitled "Come-Up Time Method of Milk Pasteurization," by Read, Boyd, Litsky, and Hankinson, Journal of Milk and Food Technology, volume 19, No. 2, February 1956. The heat exchanger described in this publication consists of a stainless steel pressure tank or reservoir and a small bore stainless steel tube. The tube is electrically heated and the virus suspension to be treated is forced through the small bore tube by air pressure at a rate so as to insure turbulent flow as determined by the Reynold's number and is heated by heat exchange from the small bore tube.

EXAMPLE 1

Newcastle disease virus (9251 strain) was used in this example. The virus had been passaged 125 times in em-

2 bryonated chicken eggs at the time of receipt and was passaged 3 more times prior to testing.

The pools of allantoic fluid containing virus were prepared from ten- or eleven-day-old embryonated eggs inoculated with a 1:10 or 1:100 dilution of infective allantoic fluid. The pools of virus were frozen in a freezer prior to use. Both hemagglutination and $EID_{50}$ titrations were performed on each pool after thawing and prior to testing.

The embryonated eggs used in this example were PPLO and pullorum free. All chickens used for vaccination purposes were hatched in the laboratory from eggs collected from known Newcastle disease-free birds. All birds were tested serologically prior to vaccination.

All chicken cells for hemagglutination titrations were obtained from birds maintained in the laboratory for that specific purpose and the blood was washed 3 times with 0.85 percent sodium chloride prior to use. Fresh cells were obtained and washed for each day's titration work. A 1 percent suspension of cells was used in the titrations and a 5 percent suspension for spot testing allantoic fluid for hemagglutination in the infectivity and sterility tests.

Vaccinated and young developing chickens were held in the same quarters. The unvaccinated birds served as controls for the vaccinated ones, since they were bled prior to vaccination themselves and their sera examined for antibody against Newcastle disease by both the hemagglutination inhibition (alpha method) and the serum neutralization test in embryonated eggs.

A given pool of Newcastle disease virus infected allantoic fluid was thawed, and titrations of both hemagglutinin and infectivity were made. A 1:10 dilution of the virus was then prepared in a large sterile vessel with sterile 0.85 percent sodium chloride so as to give a final volume of two to three liters. This material was then poured into the reservoir of the heat exchanger which had been presterilized by steam under pressure and cooled prior to use, and compressed air was applied to initiate controlled flow of the fluid. The fluid was heated to the highest temperature level to be tested in 0.033 second, and desired temperatures were regulated at different intervals. Samples heated to these temperatures in 0.033 second were collected in 500 ml. flasks containing marbles prefrozen in the freezer. The marbles served as a cooling mechanism. Samples taken were between 20 to 30 ml. in volume. There was an inherent holding time of approximately 0.022 second due to the sample collecting technique.

Each heated sample, representing the attainment of a different temperature level in 0.033 second time, was tested for its hemagglutinability and its infectivity for ten-day-old embryonated chicken eggs as shown in Table I using one degree intervals to pinpoint the temperature of inactivation. The sample at the inactivation temperature (or the sample collected at that temperature level which was unable to infect embryonated eggs) was then tested for its sterility. Sterility checks consisted of three blind passages of allantoic fluid from embryonated eggs inoculated with the sample from the heat exchanger giving no infection as reflected by hemagglutination in ten-day-old embryonated chicken eggs from Newcastle disease virus susceptible birds. If all three egg passages still proved negative for the appearance of virus then Newcastle disease virus susceptible four-week-old chickens were vaccinated with the "just" inactivated sample and tested for their immunological response. Birds were vaccinated with 0.5 or 1.0 ml. of a given sample intramuscularly as indicated.

The first batch to be tested (batch I) had an $EID_{50}$ titer of (0.1 ml.) ($10^{-11}$). As can be seen from Table I, after passage through the heat exchanger hemagglutination was completely lost at 174° F. and at 179° F. the ability to infect embryonated eggs was also lacking. Sterility checks on the 179° F. sample all proved negative for virus by hemagglutination testing of allantoic fluid from Newcastle disease virus free embryonated eggs inoculated with the sample.

Four-week-old Newcastle disease virus susceptible chicks were vaccinated intramuscularly with 0.5 ml. of the 179° F. sample every seven days for three weeks. The vaccinated birds were bled one, two, ten, and nineteen weeks after the final vaccination, and their sera was examined for its ability to inhibit hemagglutination and to neutralize virus by the serum neutralization test. Table II gives the hemagglutination inhibition and serum neutralization titers. It can be seen from this table that birds Nos. 6, 7, 8, 9, and 10 demonstrated a consistently strong immune response by the serum neutralization test through the nineteenth week. The hemagglutination inhibition titers covering the nineteen-week period were rather erratic; however, birds Nos. 6 and 7 remained consistently strong throughout while birds Nos. 8 and 10 responded strongly through the two-week period but began to fall off from the tenth week to the nineteenth week. Hemagglutination inhibition titers at the nineteen-week period were 1:640 for bird No. 9, 1:320 for birds Nos. 6 and 7, 1:160 for bird No. 8, and 1:10 for bird No. 10.

A second batch (batch II) was prepared in a like manner as described for the first batch. The $EID_{50}$ of the second batch prior to heating was (0.1 ml.) ($10^{-10}$). Temperature heated to ranged from 172° F. to 176° F. Table III shows that hemagglutination was lost at 174° F. and that the 175° F. sample was unable to infect embryonated eggs. Sterility tests on the 175° F. sample were all negative for virus by hemagglutination.

An evaluation of the immunogenic potential of the "just" inactivated or 175° F. sample was attempted. Three groups consisting of five Newcastle disease virus susceptible birds each were arranged so that each bird in the first group received one inoculation intramuscularly of 1.0 ml. of the sample; each bird in the second group received two inoculations spaced three days apart; and each bird in the third group received three inoculations three days apart. The birds in the one and two-inoculation groups were bled at two, three, six, and fifteen weeks after vaccination; and the birds in the three-inoculation groups were bled at two, three, six, and fifteen weeks after vaccination; and the birds in the three-inoculation group were bled two, six, and fifteen weeks after the final vaccination. All sera were tested for their ability to inhibit hemagglutination and all samples were tested for their ability to neutralize virus by the serum neutralization test. The results are presented in Table IV. It can readily be seen that on the basis of the relatively short term postvaccination period being reported here, a substantial immune response appeared with birds Nos. 13 and 14 two weeks after one vaccination. Three birds (Nos. 19, 20, and 23) of the two-inoculation group, for the same time interval, yielded hemagglutination inhibition titers of 1:2560 or greater, and all five birds (Nos. 19, 20, 21, 22, and 23) had serum neutralization titers ranging from $1\times10^{12}$ to $1\times10^{8}$ per ml. at this period. At the three-week period all birds in the one- and two-inoculation groups had generally consistent serum neutralization titers ranging from greater than $3\times10^{10}$ to $1\times10^{7}$ per ml. At the six-week period, serum neutralization titers ranged from greater than $2\times10^{5}$ to less than $2\times10^{2}$ per ml. for all three groups. Hemagglutination inhibition titers at the three-week period for the one- and two-inoculation groups and the two-week period for the three-inoculation group were quite consistent at greater than 1:640 with bird No. 27 of the three-inoculation group yielding a 1:80 hemagglutination inhibition titer.

At fifteen weeks one bird in the one-inoculation group yielded a hemagglutination inhibition titer greater than 1:2560, while two other birds in this group had titers of 1:640 and one of 1:320; three birds in the second group yielded hemagglutination inhibition titers of 1:640, while one was found to be greater than 1:2560; and of the three remaining birds in group three, one yielded a hemagglutination inhibition titer greater than 1:2560 and two of 1:320. Two birds in group three died during the latter part of the experimental period and unfortunately were destroyed before the cause of death could be determined.

Batch II vaccine had been stored in the freezer from the time of preparation to four and one-half months and its immunogenic potency re-evaluated. Twenty Newcastle disease virus susceptible chickens, four weeks old, were vaccinated with 0.5 ml. of batch II which had been stored in the freezer for four and one-half months. The birds were bled four and one-half weeks after vaccination and their sera were tested for their ability to inhibit hemagglutination and to neutralize virus in the serum neutralization test. Hemagglutination inhibition and serum neutralization titers for this experiment are reported in Table V. Eleven of the twenty birds yielded hemagglutination inhibition titers greater than 1:2560, one at 1:1280, one at 1:320, and two at 1:160. The remaining five birds had hemagglutination inhibition titers less than 1:160. Thus, 75 percent of the birds in this experiment yielded significant responses based on the hemagglutination inhibition tests above. Serum neutralization titers ranged from greater than $3\times10^{9}$ to $1\times10^{7}$ for thirteen of the vaccinated birds, while the remaining seven had titers of less than $3\times10^{5}$, one of which was $5\times10^{2}$ and three of $1\times10^{1}$ to $4\times10^{1}$. It is important to emphasize that the dosage was 0.5 ml. per bird and that only one vaccination was used, and also that the vaccine preparation had been stored for four and one-half months at freezer temperatures.

*Table I.—Inactivation of Hemagglutination and Infectivity by Heating to Various Temperatures in 0.033 Second*

BATCH I

| Temperature virus heated in 0.033 second to— | Titrations of hemagglutination (dilution of sample) | | | | | | Infectivity for embryonated eggs (egg No.) | | | |
|---|---|---|---|---|---|---|---|---|---|---|
| | 1:2 | 1:4 | 1:8 | 1:16 | 1:32 | 1:64 | 1 | 2 | 3 | 4 |
| Unheated | + | + | + | + | 0 | 0 | + | + | + | + |
| 135° F. | + | + | + | + | 0 | 0 | + | + | + | + |
| 170° F. | + | + | + | 0 | 0 | 0 | + | + | + | + |
| 171° F. | + | + | 0 | 0 | 0 | 0 | + | + | + | + |
| 172° F. | + | 0 | 0 | 0 | 0 | 0 | + | + | + | + |
| 173° F. | + | 0 | 0 | 0 | 0 | 0 | + | + | + | + |
| 174° F. | 0 | 0 | 0 | 0 | 0 | 0 | + | + | + | + |
| 175° F. | 0 | 0 | 0 | 0 | 0 | 0 | + | + | + | 0 |
| 176° F. | 0 | 0 | 0 | 0 | 0 | 0 | + | + | 0 | 0 |
| 177° F. | 0 | 0 | 0 | 0 | 0 | 0 | + | + | + | + |
| 178° F. | 0 | 0 | 0 | 0 | 0 | 0 | + | + | 0 | 0 |
| 179° F. | 0 | 0 | 0 | 0 | 0 | 0 | 0 | 0 | 0 | 0 |
| 180° F. | 0 | 0 | 0 | 0 | 0 | 0 | 0 | 0 | 0 | 0 |

+=hemagglutination. 0=Absence of hemagglutination.

NOTE.—All eggs for infectivity studies were inoculated with 0.1 ml. each of the specified sample.

Table II.—Hemagglutination Inhibition and Serum Neutralization Results for Sera From Newcastle Disease Virus Susceptible Chickens Vaccinated With the 179° F. Inactivated Sample of Batch I

| Bird No. | Weeks after final vaccination | | | | | | | |
|---|---|---|---|---|---|---|---|---|
| | 1 week | | 2 weeks | | 10 weeks | | 19 weeks | |
| | HI | SN/ml. | HI | SN/ml. | HI | SN/ml. | HI | SN/ml. |
| 6 | >1:1280 | $6\times10^{10}$ | >1:20,480 | >$3\times10^{10}$ | >1:320 | $7\times10^{4}$ | 1:320 | >$5\times10^{3}$ |
| 7 | >1:1280 | $2\times10^{10}$ | >10:20,480 | >$3\times10^{10}$ | >1:320 | $1\times10^{5}$ | 1:320 | >$5\times10^{3}$ |
| 8 | >1:1280 | $1\times10^{6}$ | >1:20,480 | >$3\times10^{10}$ | >1:320 | $4\times10^{3}$ | 1:160 | $5\times10^{2}$ |
| 9 | 1:80 | $1\times10^{6}$ | 1:80 | $8\times10^{8}$ | 1:20 | $4\times10^{4}$ | 1:640 | >$5\times10^{3}$ |
| 10 | >1:1280 | $1\times10^{11}$ | >1:20,480 | $4\times10^{8}$ | 1:40 | $2\times10^{8}$ | 1:10 | $5\times10^{2}$ |

HI=Hemagglutination inhibition. SN=Serum neutralization.

NOTE.—Pooled sera from five control birds was run coincidently with the test and no inhibition of hemagglutination or neutralization of test virus was evident.

Table III.—Inactivation of Hemagglutination and Infectivity by Heating to Various Temperatures in 0.033 Second

BATCH II

| Temperature virus heated in 0.033 second to— | Titrations of hemagglutination (dilution of sample) | | | | | | | Infectivity for embryonated eggs (egg No.) | | | |
|---|---|---|---|---|---|---|---|---|---|---|---|
| | 1:2 | 1:4 | 1:8 | 1:16 | 1:32 | 1:64 | 1:128 | 1 | 2 | 3 | 4 |
| Unheated | + | + | + | + | + | + | 0 | + | + | + | + |
| 135° F. (preheat) | + | + | + | + | + | + | 0 | + | + | + | 0 |
| 172° F | + | + | + | + | + | + | 0 | + | + | + | 0 |
| 173° F | + | + | + | + | + | + | 0 | + | 0 | 0 | 0 |
| 174° F | 0 | 0 | 0 | 0 | 0 | 0 | 0 | + | 0 | 0 | 0 |
| 175° F | 0 | 0 | 0 | 0 | 0 | 0 | 0 | 0 | 0 | 0 | 0 |

+=hemagglutination. 0=absence of hemagglutination.

NOTE.—All eggs for infectivity studies were inoculated with 0.1 ml. each of the specified sample.

Table V.—Hemagglutination Inhibition and Serum Neutralization Results for Sera From Newcastle Disease Virus Susceptible Chickens Vaccinated With 0.5 ml. of the 175° F. Sample of Batch II After Storage at Freezer Temperature for Four and One-half Months

| Bird No. | Four and one-half weeks after vaccination | |
|---|---|---|
| | HI titer | SN titer |
| 36 | 1:1280 | <$3\times10^{5}$ |
| 37 | >1:2560 | >$1\times10^{9}$ |
| 39 | >1:2560 | >$2\times10^{9}$ |
| 40 | <1:10 | $5\times10^{2}$ |
| 41 | >1:2560 | $6\times10^{7}$ |
| 42 | 1:40 | $6\times10^{8}$ |
| 43 | >1:2560 | >$3\times10^{9}$ |
| 44 | 1:320 | $1\times10^{1}$ |
| 45 | 1:80 | $3\times10^{1}$ |
| 46 | >1:2560 | >$3\times10^{9}$ |
| 47 | <1:10 | $4\times10^{1}$ |
| 48 | >1:2560 | $1\times10^{7}$ |

Table IV.—Hemagglutination Inhibition and Serum Neutralization Results for Sera From Newcastle Disease Virus Susceptible Chickens Vaccinated With the 175° F. Inactivated Sample of Batch II

ONE INOCULATION

| Bird No. | Time after final vaccination | | | | | | | |
|---|---|---|---|---|---|---|---|---|
| | 2 weeks | | 3 weeks | | 6 weeks | | 15 weeks | |
| | HI | SN/ml. | HI | SN/ml. | HI | SN/ml. | HI | SN/ml. |
| 13 | >1:2560 | $3\times10^{8}$ | >1:640 | $1\times10^{10}$ | >1:320 | $1\times10^{5}$ | 1:640 | >$5\times10^{3}$ |
| 14 | >1:2560 | $5\times10^{5}$ | >1:640 | $1\times10^{7}$ | 1:40 | <$2\times10^{2}$ | 1:10 | $5\times10^{1}$ |
| 16 | 1:40 | $3\times10^{3}$ | >1:640 | $5\times10^{7}$ | >1:320 | >$2\times10^{5}$ | 1:640 | >$5\times10^{3}$ |
| 17 | 1:40 | <$1\times10^{3}$ | >1:640 | >$3\times10^{10}$ | >1:320 | $5\times10^{3}$ | 1:320 | $8\times10^{2}$ |
| 18 | 1:20 | $6\times10^{4}$ | >1:640 | $3\times10^{8}$ | >1:320 | >$2\times10^{4}$ | >1:2560 | >$5\times10^{3}$ |

TWO INOCULATIONS

| 19 | 1:2560 | $1\times10^{10}$ | >1:640 | >$3\times10^{10}$ | >1:320 | $1\times10^{5}$ | >1:2560 | >$5\times10^{3}$ |
| 20 | 1:2560 | $1\times10^{12}$ | >1:640 | >$3\times10^{10}$ | 1:320 | >$2\times10^{5}$ | 1:640 | >$5\times10^{3}$ |
| 21 | 1:80 | $1\times10^{8}$ | >1:640 | >$3\times10^{10}$ | >1:320 | $6\times10^{3}$ | 1:160 | $2\times10^{2}$ |
| 22 | 1:40 | $3\times10^{8}$ | >1:640 | $4\times10^{9}$ | >1:320 | $1\times10^{5}$ | 1:640 | $5\times10^{2}$ |
| 23 | >1:2560 | $3\times10^{8}$ | >1:640 | >$3\times10^{10}$ | >1:320 | >$2\times10^{5}$ | 1:640 | $7\times10^{3}$ |

THREE INOCULATIONS

| 24 | >1:640 | >$3\times10^{10}$ | | | >1:320 | >$2\times10^{5}$ | (1) | |
| 25 | >1:640 | >$3\times10^{10}$ | | | >1:320 | $1\times10^{5}$ | (1) | |
| 26 | >1:640 | >$3\times10^{10}$ | | | >1:320 | $1\times10^{5}$ | >1:2560 | <$1\times10^{4}$ |
| 27 | 1:80 | $4\times10^{9}$ | | | 1:160 | $1\times10^{3}$ | 1:320 | $2\times10^{2}$ |
| 28 | >1:640 | >$3\times10^{10}$ | | | >1:320 | $1\times10^{5}$ | 1:320 | $5\times10^{3}$ |

[1] Birds died during the fifteen-week period.
HI=Hemagglutination inhibition. SN=Serum neutralization.

NOTE.—Pooled sera from five control birds was run coincidently with the test and no inhibition of hemagglutination or neutralization of test virus was evident.

Table V—Continued

| Bird No. | Four and one-half weeks after vaccination | |
|---|---|---|
| | HI titer | SN titer |
| 49 | >1:2560 | <3×10⁵ |
| 50 | >1:2560 | >3×10⁹ |
| 51 | 1:160 | 5×10³ |
| 52 | 1:160 | <3×10⁵ |
| 53 | 1:10 | 2×10³ |
| 54 | >1:2560 | >3×10⁹ |
| 55 | >1:2560 | >3×10⁹ |
| 56 | >1:2560 | 2×10³ |

HI=Hemagglutination inhibition. SN=Serum neutralization.

NOTE.—Pooled sera from five control birds was run coincidently with the test and no inhibition of hemagglutination or neutralization of test virus was evident.

EXAMPLE 2

The virus of influenza A-strain PR8 was subjected to the identical high temperature-short time thermal inactivation treatment as set forth above with respect to the Newcastle disease virus using a 1:10 dilution of chick embryo allantoic fluid suspension of the virus.

Table VI shows the inactivation of hemagglutination and infectivity of the influenza virus suspension. The results show that infectivity of the virus for ten-day-old chick embryos was lost at 162° F.

A group of five four-week-old chicks were given three 1 ml. vaccinations of this inactivated sample spaced one week apart. These five birds along with unvaccinated control birds were then bled four days, ten days, and fourteen week following the final vaccination. Their sera was examined for its ability to inhibit hemagglutination and to neutralize virus in the serum neutralization test. The results of these tests are shown in Table VII. Four days after the final vaccination or twenty-five days after the first vaccination, all five chickens yielded HI titers ranging from 1:640 to 1:160 and SN titers ranging from 5×10⁸ to 1×10⁵. Ten days after the final vaccination the HI titers had not changed appreciably, but the SN titers dropped slightly and ranged from 3×10⁴ to 1×10³.

At fourteen weeks the SN titers ranged from 7×10³ to 3×10³. The HI titers were still quite consistent. Chicken No. 31 died during the latter part of the experiment and unfortunately was destroyed before the cause of death could be ascertained.

The results of this experiment show that the inactivated influenza suspension was capable of stimulating an immune response in the vaccinated birds. The response of the chickens to the vaccine held up for the fourteen-week period even though there was a rather significant drop in HI titer after the ten-day test period.

The inactivated virus of influenza A-strain PR8 was found to possess the ability to produce a significant immune response in four-week-old chicks. Even though the SN and HI titers dropped during the fourteen-week holding period, SN titers in the range of 10³ were detected as well as significant HI titers.

The virus suspensions treated in the above examples were heated to the inactivating temperatures almost instantaneously (0.033 second). The time limit of 0.033 second was chosen because of convenience in view of the equipment being used to heat the virus suspensions. The virus suspensions were also preheated to a temperature of 135° F. by means of heat exchange from a portion of the heating tube before being heated to the inactivating temperature. The virus suspensions were heated to the inactivating temperature by heat exchange from a one-foot section of the heating tube at the discharge end of the heating apparatus which was designed so that the temperature could be controlled as desired by electrical means. The apparatus was calibrated to heat to the desired inactivating temperature in 0.033 second and to yield 1100 ml. of inactivated virus suspension per minute.

The particular temperature capable of inactivating the live virus microorganisms will depend mainly upon the particular virus being inactivated and the time during which the virus suspension is heated. Using a preselected time such as the 0.033 second selected in the above examples, the temperature at which the virus becomes inactivated or "just" inactivated can readily be determined by those skilled in the art in the same manner in which the inactivating temperatures were determined in the above examples. A preliminary run from a preheat temperature of about 135° F. at 5 degree intervals might be helpful before pinpointing the exact inactivating temperature by heating the virus suspension at 1 degree intervals. At temperatures below the inactivating temperature the infectivity properties of the virus suspensions are still retained. Heating the virus suspensions to temperatures beyond the "just" inactivating temperatures is not necessary or even desirable since the use of higher temperatures will generally tend to destroy the antigenic structure of the vaccine.

The time in which the virus suspensions are heated to the inactivating temperature should be as rapid as possible but sufficiently slow so as to effect the desired inactivation. Generally, it is advisable to heat to the inactivating temperature within a fraction of a second.

After the virus vaccines have been heated to the inactivating temperature they are cooled by suitable means such as by collecting the heated virus suspension in flasks containing marbles stored in a freezer until just prior to collection of the suspension. Generally, the total heating and cooling time is less than two minutes.

Table VI.—Inactivation of Hemagglutination and Infectivity of Influenza A-Strain PR8 By Heating to Various Temperatures in 0.033 Second

| Temperature virus heated in 0.033 second to— | Titrations of hemagglutination (dilution of sample) | | | | | Infectivity for embryonated eggs (egg No.) | | | |
|---|---|---|---|---|---|---|---|---|---|
| | 1:2 | 1:4 | 1:8 | 1:16 | 1:32 | 1 | 2 | 3 | 4 |
| Unheated | + | + | ± | 0 | 0 | + | + | + | + |
| 160° F | + | ± | 0 | 0 | 0 | + | + | 0 | 0 |
| 161° F | + | ± | 0 | 0 | 0 | + | + | 0 | 0 |
| 162° F | + | ± | 0 | 0 | 0 | 0 | 0 | 0 | 0 |
| 163° F | + | 0 | 0 | 0 | 0 | 0 | 0 | 0 | 0 |
| 164° F | + | 0 | 0 | 0 | 0 | 0 | 0 | 0 | 0 |
| 165° F | 0 | 0 | 0 | 0 | 0 | 0 | 0 | 0 | 0 |
| 166° F | 0 | 0 | 0 | 0 | 0 | 0 | 0 | 0 | 0 |
| 167° F | 0 | 0 | 0 | 0 | 0 | 0 | 0 | 0 | 0 |

+=hemagglutination. 0=absence of hemagglutination.

NOTE.—All eggs for infectivity studies were inoculated with 0.1 ml. each of the specified sample.

Table VII.—Hemagglutination Inhibition and Serum Neutralization Results for Sera From Chickens Vaccinated With 162° F. Inactivated Sample of Influenza A-Strain PR8 (3 Shots of 1.0 Ml. Each One Week Apart)

| Bird No. | Time after final vaccination | | | | | |
|---|---|---|---|---|---|---|
| | 4 days | | 10 days | | 14 weeks | |
| | HI | SN/ml. | HI | SN/ml. | HI | SN/ml. |
| 29 | 1:160 | 1×10⁵ | 1:160 | 1×10⁴ | >1:320 | 7×10³ |
| 30 | 1:640 | 4×10⁶ | >1:640 | 1×10³ | 1:160 | 3×10³ |
| 31 | 1:320 | 5×10⁶ | 1:320 | 3×10⁴ | | |
| 32 | 1:160 | 5×10⁶ | 1:160 | 1×10³ | >1:320 | 7×10³ |
| 33 | 1:160 | 1×10⁶ | 1:320 | 3×10³ | >1:320 | 7×10³ |

HI=Hemagglutination inhibition. SN=Serum neutralization.

NOTE.—Pooled sera from five control birds was run coincidently with the test and no inhibition of hemagglutination or neutralization of test virus was evident.

We claim:

1. The method of treating a suspension of virus microorganisms to render the microorganism non-infective without significantly impairing the antigenic properties thereof which comprises:

(1) heating a sample of a suspension of virus microorganisms by a heat-exchanger at various different relatively high temperatures in about a fraction of a second;
(2) testing the microorganisms after heating at each temperature to determine the infectivity thereof;
(3) continuing the heating of samples of suspensions of virus microorganisms as described in step 1 so long as the sample still exhibits infectivity at the temperatures employed until a temperature is obtained at which the microorganisms do not exhibit infectivity when tested and which microorganisms retain substantially maximum antigenicity; and
(4) then heating an entire batch of a suspension of virus microorganisms propagated under substantially the same conditions as the microorganism contained in the test samples in about a fraction of a second at the temperature determined according to step 3 at which the microorganism does not exhibit infectivity but retains substantially maximum antigenicity.

2. The method of claim 1 in which the suspension of virus microorganisms is heated at the temperature at which the microorganism does not exhibit infectivity but retains substantially maximum antigenicity in about .033 second.

3. The method of claim 1 in which the virus suspension of microorganisms is Newcastle disease virus.

4. The method of claim 1 in which the suspension of virus microorganisms is influenze.

References Cited in the file of this patent

UNITED STATES PATENTS

| | | |
|---|---|---|
| 2,202,435 | Shoetensack | May 28, 1940 |
| 2,324,646 | Rake | July 20, 1943 |

FOREIGN PATENTS

| | | |
|---|---|---|
| 160,542 | Australia | Jan. 13, 1955 |

OTHER REFERENCES

JAMA, vol. 158, May 14, 1955, p. 138.
Zinsser's Textbook of Bacteriology, Appleton-Century-Crafts, N.Y., 9th ed., 1948, pp. 14, 15, 698, 699.
PSEBM, 93: 1, October 1956, pp. 51–52.